United States Patent [19]

Stewart et al.

[11] Patent Number: 4,676,870
[45] Date of Patent: Jun. 30, 1987

[54] AUTOMATIC CONTROL OF A MULTIPLE-EFFECT EVAPORATOR

[75] Inventors: William S. Stewart; John D. Hottovy; John E. Blaesi, all of Bartlesville, Okla.

[73] Assignee: Phillips Petroleum Company, Bartlesville, Okla.

[21] Appl. No.: 869,767

[22] Filed: Jun. 2, 1986

[51] Int. Cl.$^4$ .......................... B01D 1/26; B01D 3/42
[52] U.S. Cl. ..................................... 159/17.1; 159/44; 159/47.1; 159/DIG. 30; 159/DIG. 34; 202/160; 202/174; 203/2; 364/501; 423/179; 423/641
[58] Field of Search ............ 159/17.1, 17.2, 17.3–20.2, 159/44, 47.1, DIG. 30, DIG. 34; 203/1–3, DIG. 18, 73, 25; 23/302 T; 202/174, 160, 206; 423/179, 641; 364/500–502

[56] References Cited

U.S. PATENT DOCUMENTS

| | | | |
|---|---|---|---|
| 2,734,566 | 2/1956 | Simms | 159/44 |
| 2,748,849 | 6/1956 | Hart | 159/44 |
| 2,931,433 | 4/1960 | Mertz | 159/47 |
| 3,154,456 | 10/1964 | Sims et al. | 159/20 |
| 3,203,466 | 8/1965 | Eckstrom | 159/44 |
| 3,220,883 | 11/1965 | Howard | 159/44 |
| 3,241,599 | 3/1966 | Jobe | 159/44 |
| 3,286,764 | 11/1966 | Mojonnier et al. | 159/44 |
| 3,899,386 | 8/1975 | Komiyama et al. | 159/44 |
| 4,557,799 | 12/1985 | Nelson et al. | 159/44 |

*Primary Examiner*—Wilbur Bascomb
*Attorney, Agent, or Firm*—George E. Bogatie

[57] ABSTRACT

A feedforward control system for a multiple-effect evaporator is provided wherein control is based on maintaining desired values for inferential variables of concentration and boiling point rise for a solution of a solid inorganic substance.

14 Claims, 1 Drawing Figure

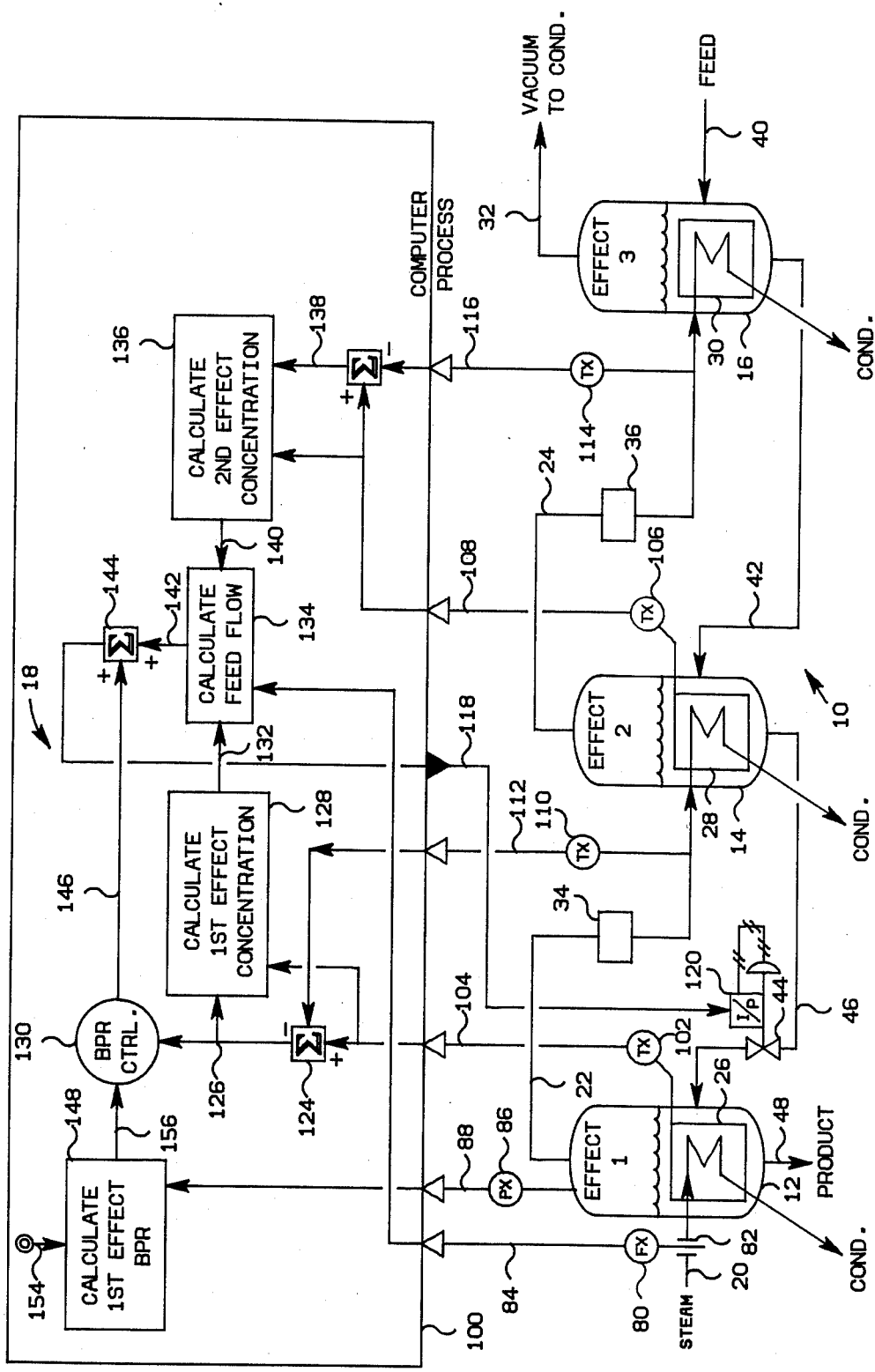

AUTOMATIC CONTROL OF A MULTIPLE-EFFECT EVAPORATOR

This invention relates to control of a multiple effect evaporator. In one aspect this invention relates to method and apparatus for maintaining a desired concentration of a dissolved solid in the liquid product stream withdrawn from a multiple effect evaporator. As used herein a multiple-effect evaporator is an assembly of evaporators wherein each evaporator is called an effect and in which the effects are numbered in the order of decreasing boiling temperature.

In any evaporation process, the major cost is the steam consumed. Therefore, methods of reducing steam consumption are very attractive. The most common of the available methods is to employ a multiple-effect evaporator.

In conventional multiple-effect operation, a feed stream comprising a dilute aqueous solution containing at least one dissolved solid is supplied to an inlet of the multiple-effect evaporator. Heat is supplied to the first effect by passing prime steam through a steam chest submerged in the liquid contained in the first effect vessel. By boiling off part of the water, usually at reduced pressure, the dilute solution becomes concentrated in the dissolved solid. For example, a triple-effect system can be used to concentrate 5 percent NaOH to 50 percent NaOH, by weight. The finished product containing 50 percent NaOH by weight, is withdrawn from an outlet of the multiple effect evaporator. Typically, the concentration of the final discharge from the multiple effect evaporator may be regulated by manipulating either the steam rate or the feed to the first effect with levels being controlled by rates of withdrawals.

Many different methods have been proposed for controlling multiple effect evaporators in such a manner that the final product meets the desired specification for concentration. These methods have utilized density, viscosity, and specific gravity detectors for determining the concentration of the dissolved solid in the final product. Control of the evaporator is then based on measuring a property of the final product, such as the product density with a density sensor, and manipulating the amount of steam supplied to the first effect or the amount of feed supplied to the first effect by a three-mode controller. Feedforward control methods have also been proposed wherein the control system reacts to disturbances in measured load variable such as feed rate when they occur rather than waiting for them to pass through the process before initiating corrective action.

Even if meansurement of the final product stream to determine concentration is possible, the lack of reliable, fast responding, economical analyzers for a majority of chemical systems hinders widespread utilization of control systems based on measurement of concentration.

It is thus an object of this invention to utilize a measurement of temperature and the boiling point rise of a solution to infer the concentration of a dissolved solid in the solution. As used herein, boiling point rise is the difference between the boiling point of water at a specified pressure and the boiling point of a solution at that pressure. The boiling point rise of high molecular weight substances is so small as to be of little consequence, however, with certain inorganic substances, especially with sodium hydroxide, the boiling point rise is very large.

It is a further object of this invention to utilize a measurement of pressure and a desired concentration to infer the boiling point rise of a solution required to achieve the desired concentration.

It is a still further object of this invention to utilize the inferred concentration and inferred boiling point rise as a basis for controlling a multiple-effect evaporator wherein the concentration of the final product can be controlled, and further wherein the control system reacts in a feedforward manner to disturbances in concentration.

In accordance with the present invention method and apparatus are provided whereby a material balance on the first effect vessel, and a sodium hydroxide balance which is based on inferred concentrations, also on the first effect are utilized to calculate a feedforward control signal representative of the feed flow to the first effect. The feedforward control signal manipulates the position of a control valve in the feed inlet to the first-effect. In operation the feedforward control signal is responsive to steam flow to the first effect, and concentration of the solution in the first effect and second effect.

Additional method and apparatus are provided whereby a concentration set point is maintained for the final product. A pressure measurement of the first-effect vapor space, and a set point signal representative of the desired concentration for the final product are utilized to infer a desired boiling point rise for the first effect. The desired boiling point rise which is based on an actual pressure measurement and a desired concentration, is utilized as a set point for a boiling point rise (BPR) controller. The BPR controller compares its set point and the actual BPR of the first effect and establishes an output signal representative of the difference therebetween. In operation the output of the BPR controller is scaled so as to bias the feedforward control signal provided to position the control valve in the feed inlet to the first effect in a manner that maintains the actual BPR essentially equal to the desired BPR.

Other objects and advantages of the invention will be apparent from the foregoing brief description of the invention and from the claims as well as from the detailed description of the drawing FIGURE, which is briefly described as follows:

The FIGURE is a diagrammatic illustration of a triple effect evaporation process and the associated control system of the present invention.

The invention is illustrated in terms of a triple effect system which concentrates a dilute solution of sodium hydroxide. However, the invention is applicable to any multiple effect evaporator system where the concentration of a first and a second effect can be determined, and a boiling point rise of the first effect can be determined. For example, dilute solutions of solids other than sodium hydroxide may be utilized as feed mixtures, also solutions having a plurality of dissolved solids may be utilized as feed mixtures. As a specific example of a feed mixture having a plurality of dissolved solids, a sodium hydroxide solution saturated with sodium chloride may be utilized in the feed mixture with the evaporation process separating the sodium chloride by crystallization to provide a solid product and in addition providing a liquid product stream reconcentrated in sodium hydroxide.

A specific control system configuration is set forth in the FIGURE for the sake of illustration. However, the invention extends to different types of control system configurations which accomplish the purpose of the invention. Lines designated as signal lines in the drawings are electrical or pneumatic in this preferred embodiment. Generally, the signals provided from any transducer are electrical in form. However, the signals provided from flow sensors will generally be pneumatic in form. Transducing of these signals is not illustrated for the sake of simplicity because it is well known in the art that if a flow is measured in pneumatic form it must be transduced to electrical form if it is to be transmitted in electrical form by a flow transducer. Also, transducing of the signals from analog form to digital form or from digital form to analog form is not illustated because such transducing is also well known in the art.

The invention is also applicable to mechanical, hydraulic or other signal means for transmitting information. In almost all control systems some combination of electrical, pneumatic, mechanical or hydraulic signals will be used. However, the use of any other type of signal transmission, compatible with the process and equipment in use, is within the scope of the invention.

A digital computer is used in the preferred embodiment of this invention to calculate the required control signals based on measured process parameters as well as set points supplied to the computer. Analog computers or other types of computing devices could also be used in the invention. The digital computer is preferably an OPTROL 7000 Process Computer system for Applied Automation, Inc. Bartlesville, Okla.

Signal lines are also utilized to represent the results of calculations carried out in a digital computer and the term "signal" is utilized to refer to such results. Thus, the term signal is used not only to refer to electrical currents or pneumatic pressures but is also used to refer to binary representations of a calculated or measured value.

The controllers shown may utilize the various modes of control such as proportional, proportional-integral, proportional-derivative, or proportional-integral-derivative. In this preferred embodiment, proportional-integral-derivative controllers are utilized but any controller capable of accepting two input signals and producing a scaled output signal, representative of a comparison of the two input signals, is within the scope of the invention.

The scaling of an output signal by a controller is well known in the control system art. Essentially, the output of a controller may be scaled to represent any desired factor or variable. An example of this is where a desired flow rate and an actual flow rate is compared by a controller. The output could be a signal representative of a desired change in the flow rate of some gas necessary to make the desired and actual flows equal. On the other hand, the same output signal could be scaled to represent a percentage or could be scaled to represent a temperature change required to make the desired and actual flows equal. If the controller output can range from 0 to 10 volts, which is typical, then the output signal could be scaled so that an output signal having a voltage level of 5.0 volts corresponds to 50 percent, some specified flow rate, or some specified temperature.

The various transducing means used to measure parameters which characterize the process and the various signals generated thereby may take a variety of forms or formats. For example, the control elements of the system can be implemented using electrical analog, digital electronic, pneumatic, hydraulic, mechanical or other similar types of equipment or combination of one or more such equipment types. While the presently preferred embodiment of the invention preferably utilizes a combination of pneumatic final control elements in conjunction with electrical analog signal handling and translation apparatus, the apparatus and method of the invention can be implemented using a variety of specific equipment available to and understood by those skilled in the process control art. Likewise, the format of the various signals can be modified substantially in order to accommodate signal format requirements of the particular installation, safety factors, the physical characteristics of the measuring or control instruments and other similar factors. For example, a raw flow measurement signal produced by a differential pressure orifice flow meter would ordinarily exhibit a generally proportional relationship to the square of the actual flow rate. Other measuring instruments might produce a signal which is proportional to the measured parameter, and still other transducing means may produce a signal which bears a more complicated, but known, relationship to the measured parameter. Regardless of the signal format or the exact relationship of the signal to the parameter which it represents, each signal representative of a measured process parameter or representative of a desired process value will bear a relationship to the measured parameter or desired value which permits designation of a specific measured or desired value by a specific signal value. A signal which is representative of a process measurement or desired process value is therefore one from which the information regarding the measured or desired value can be readily retrieved regardless of the exact mathematical relationship between the signal units and the measured desired process units.

Referring now to the drawing there is illustrated generally at 10 the triple effect evaporator having three identical effects. Steam under pressure is fed to the steam chest 26 of first-effect 12 through steam conduit means 20, to heat the liquid in the first effect. The vapor formed in the first-effect is passed through desuperheater 34, which can be any conventional desuperheater located in steam conduit means 22, to the steam chest 28 of the second-effect 14 to heat the liquid in a second effect. In a similar manner vapor formed in the second effect 14 is passed via steam conduit means 24 and desuperheater 36 to the steam chest 30 of the third-effect 16. Vapors formed in the third-effect are withdrawn by a vacuum pump through steam conduit means 32.

The liquid to be evaporated is fed to the third-effect 16 through feed supply conduit means 40 and the boiled. The residue from the third-effect 16 is fed via conduit means 42 to the second-effect 14 where it is again boiled. The residue from the second effect 14 is introduced to the first effect 12 through control valve 44 which is located in feed conduit means 46, and again boiled in the first-effect. The final concentrate is withdrawn through product conduit means 48. For the sake of simplicity pumps required to provide flow of residue between effects have not been illustrated. Also not illustrated are additional heat exchangers, additional measurement and control components, and other typical equipment such as separators which can be associated with an evaporator process but which play no part in the present invention.

The manner in which the various process variables are measured and the results of that measurement provided to a computer is as follows.

Flow transducer 80 in combination with a flow sensor 82 which is operably located in steam conduit means 20 provides an output signal 84 which is representative of the actual flow rate of steam through conduit means 20. Signal 84 is provided from flow transducer 80 as an input to computer 100.

Pressure transducer 86 in combination with a pressure sensing device which is operably located in the vapor space in the upper portion of the first effect 12, provides an output signal 88 which is representative of the actual pressure in the upper portion of the first-effect 12. Signal 88 is provided from pressure transducer 86 as an input to computer 100.

Temperature transducer 102 in combination with a temperature measuring device such as a thermocouple which is operably located on the upper surface of steam chest 26, provides an output signal 104 which is representative of the temperature of the liquid in the first effect 12 and is an indication of the boiling point temperature of boiling liquids. Likewise temperature transducer 106 provides an output signal 108 which is representative of the temperature of the liquid in the second-effect 14. Signals 104 and 108 are provided as inputs to computer 100.

Temperature transducer 110 in combination with a temperature measuring device such as a thermocouple which is operably located in the steam conduit means 22 at a point between desuperheater 34 and the second effect 14, provides an output signal 112 which is representative of the temperature of desuperheated vapor flowing through steam conduit means 22. Likewise temperature transducer 114 provides an output signal 116 which is representative of the temperature of desuperheated vapor flowing in steam conduit means 24. Signals 108 and 116 are provided as inputs to computer 100.

In response to the described inputs, computer 100 calculates the flow rate of feed to the first-effect 12 required to maintain a solute balance for the first-effect and to maintain a desired concentration of the product stream flowing in conduit means 48. The desired feed flow rate for the first effect 12 is provided from computer 100 as a set point signal 118 to valve positioner 120 which is operably located with control valve 44.

The logic utilized to calculate the magnitude of set point signal 118 is illustrated in the FIGURE generally at 18. Signal 104 which is representative of the actual boiling point temperature of the liquid in the first-effect is provided as a first input to summing block 124 and is also provided to computer block 128. Likewise, signal 112 which is representative of the temperature of the desuperheated vapor flowing in conduit means 22 is provided as a second input to summing block 124. Signal 112 is subtracted from signal 124 to establish signal 126 which is representative of the actual boiling point rise in the first-effect 12. Signal 126 is provided as an input to computer block 128 and as a process variable input to boiling point rise controller 130.

Computer block 128 calculates the concentration of a dissolved solid in the liquid contained in the first-effect 12. In a typical solution the concentration varies with both temperature and boiling point rise. For a sodium hydroxide solution saturated with sodium chloride the concentration of sodium hydroxide is given by equation 1 below which is based on a published chart of boiling points:

$$x = 3.43 - 0.49\, Ln(B) - 0.49\, Ln(T) - 2.67/Ln(B) + 0.11\, Ln(B) + Ln(T) \qquad \text{Eq. 1}$$

where:
- $x$ = concentration, in weight fraction
- $B$ = boiling point rise, degrees F.
- $T$ = temperature, degrees F.
- $Ln$ = natural logarithm Equation 1 is obtained by assuming a general form of an equation and then fitting the assumed form to plotted data. It is recognized that various general forms can be assumed and that the goodness of fit to the plotted data determines the particular general form selected.

Signal 132 which is representative of the inferred concentration of dissolved solid in the first-effect 12 is provided from computer block 128 to the calculate feedflow computer block 134.

In a similar manner and utilizing the identical equation as in the calculate first-effect concentration computer block 128, the concentration of sodium hydroxide in the second-effect is calculated in computer block 136. Signal 116 is subtracted from 108 to establish signal 138 which is representative of the actual boiling point rise in the second-effect 14. Signal 138 and 108 representative respectively of the boiling point rise and the boiling point temperature of the solution in the second-effect 14 are provided as inputs to the calculate second-effect concentration block 136. In response to signals 108 and 138 computer block 136 provides an output signal 140 which is representative of the inferred concentration of a dissolved solid in the second-effect 14. Signal 140 is provided from computer block 136 as an input to the calculate feedflow computer block 134.

In response to signals 84, 132 and 140 which are respectively representative of steam flow to the first-effect, concentration of the first-effect and concentration of the second-effect, computer block 134 solves mass balance and solute balance equations around the first-effect 12 to determine the first effect feedflow required to maintain the solute balance.

The feed flow to the first-effect is given by the equation 2 below which is based on a material and a solute balance around the first effect.

$$F_2 = F_s(x_1/x_2)/(x_1/x_2) - 1 \qquad \text{Eq. 2}$$

where:
- $F_2$ = feedflow to first-effect, pounds per hour
- $x_1$ = concentration of dissolved solid in final product, weight fraction
- $x_2$ = concentration of dissolved solid in second-effect, weight fraction
- $F_s$ = flow of steam to first-effect, pounds per hour.

Signal 142, which is representative of the feed flow rate to the first-effect required to maintain a solute balance for the first effect 12, is provided from computer block 134 to summing block 144. Also provided to summing block 144 is signal 146 which is developed from an inferred boiling point rise as described immediately below.

Signal 88, which is representative of the pressure in the first effect 12 is provided as an input to the calculate first-effect boiling point rise computer block 148. Also provided to computer block 148 is signal 154 which is a set point representative of the desired concentration of dissolved solids in the product withdrawn through conduit means 48. In a typical solution the boiling point rise may vary with both concentration and pressure. A boiling point rise can be inferred from a desired concentration as provided by set point signal 154 and a measured pressure as provided by signal 88.

For a sodium hydroxide solution, saturated with sodium chloride, the boiling point rise of the solution is given by equation 3 below which, like equation 1, as based on a published chart of boiling points.

$$B = 2.68 + 7.49(e^x)^3 + 2.05\, A\log(P) + 280x^3 + 6.90x^2\, A\log(P) \qquad \text{Eq. 3}$$

where:
x = concentration of dissolved solid, weight fraction
p = pressure, psia
B = equals boiling point rise of solution, degrees F.
log = base 10 logarithm Equation 3, like equation 1, is a curve fit of plotted data and various forms are possible.

Signal 156 which is representative of boiling point rise required for a solution to have the concentration indicated by signal 154 and the pressure indicated by signal 88. Signal 156 is provided from computer block 148 as a set point signal to boiling point rise controller 130. Signal 146 is responsive to the difference between signals 156 and 126 is scaled so as to bias signal 142 in a manner required to maintain the actual boiling point rise represented by signal 126 substantially equal to the desired boiling point rise represented by signal 156. Signals 142 and 146 are summed in summing block 144 to establish signal 118 which is representative of the position of control valve 44 required to maintain a solute balance wherein the concentration of the finished product is represented by signal 154. Signal 118 is provided from computer 100 as a set point signal for valve positioner 120 and valve 44 is manipulated in response to signal 118.

The invention has been described in terms of a presently preferred embodiment as illustrated in the FIGURE. Specific components used in the practice of the invention such as flow sensor 82, flow transducer 80, temperature transducers 102, 106, 110, 114, pressure transducer 86, control valve 44, and valve positioner 120 are each well known commercially available components such as described at length in *Perry's Chemical Engineer's Handbook*, 4th edition, chapter 22, McGraw Hill.

While the invention has been described in terms of the present preferred embodiment, reasonable variation and modifications are possible by those skilled in the art and such variations and modifications are within the scope of the described invention and appended claims.

That which is claimed is:

1. Apparatus comprising:
    a multiple-effect evaporator having at least a first effect and a second effect for concentrating a dilute solution, said multiple-effect evaporator having a steam chest associated with each effect;
    means for supplying steam from an external source to said steam chest of said first-effect for use as a heating fluid;
    means for passing a feed mixture comprising a dilute solution of at least one dissolved solid into said multiple-effect evaporator;
    means for withdrawing a liquid product stream from said multiple-effect evaporator, said liquid product stream having an increased concentration of said at least one dissolved solid with respect to said feed mixture;
    means for establishing a first signal representative of the actual boiling point rise of the liquid in said first-effect;
    means for establishing a second signal representative of the actual temperature of the liquid in said first-effect;
    means for establishing a third signal representative of the concentration of said at least one dissolved solid in the liquid in said first-effect based on the value of said first signal, and the value of said second signal;
    means for establishing a fourth signal representative of the steam flow to said steam chest of said first-effect;
    means for establishing a fifth signal representative of the boiling point rise of the liquid in said second-effect;
    means for establishing a sixth signal representative of the actual temperature of the liquid in said second-effect;
    means for establishing a seventh signal representative of the concentration of said at least one dissolved solid in the liquid in said second-effect based on the value of said fifth signal and said sixth signal;
    means for establishing an eighth signal representative of the feed flow to said first-effect based on the value of said third signal, said fourth signal, and said seventh signal; and
    means for manipulating the feed flow to said first-effect in response to said eighth signal wherein the manipulation of the feed flow to said first-effect in response to said eighth signal results in the feed flow to said first-effect being proportional to the concentration represented by said third signal, the steam flow represented by said fourth signal and the concentration represented by said seventh signal, to thereby maintain a solute balance for said first-effect.

2. Apparatus in accordance with claim 1 wherein said means for manipulating the feed flow to said first-effect in response to said eighth signal comprises:
    means for establishing a ninth signal representative of the actual pressure in a vapor space of said first-effect;
    means for establishing a tenth signal representative of the desired concentration of said at least one dissolved solid in said first-effect;
    means for establishing an eleventh signal representative of the boiling point rise required to maintain the desired concentration represented by said tenth signal, based on the value of said ninth signal and said tenth signal;
    means for comparing said eleventh signal and said first signal to establish a twelfth signal which is responsive to the difference between said eleventh signal and said first signal;
    means for summing said twelfth signal and said eighth signal to establish a thirteenth signal, wherein said twelfth signal is scaled to so as to bias said eighth signal in a manner that maintains said first signal substantially equal to said eleventh signal;
    a control valve operably located so as to control the feed flow to said first-effect; and
    means for manipulating said control valve in response to said thirteenth signal.

3. Apparatus in accordance with claim 1 wherein said means for establishing said first signal and means for establishing said fifth signal comprise:
    means for establishing a ninth signal representative of the temperature of desuperheated steam flow from said first-effect to said second-effect;

means for subtracting said ninth signal from said second signal to establish said first signal;

means for establishing a tenth signal representative of the temperature of desuperheated steam flowing from said second-effect to a third-effect; and means for subtracting said tenth signal from said sixth signal to establish said fifth signal.

4. Apparatus in accordance with claim 1 wherein said means for establishing a third signal representative of the concentration of said at least one dissolved solid in the liquid in said first effect based on the value of said first signal, and the value of said second signal comprises:

means for calculating the value for the concentration of said at least one dissolved solid from a polynominal having independent variables of boiling point rise and temperature.

5. Apparatus in accordance with claim 2 wherein said means for establishing an eleventh signal representative of the boiling point rise required to maintain the desired concentration represented by said tenth signal based on the value of said ninth signal and said tenth signal comprises:

means for calculating the desired boiling point rise for the solution in said first effect from a polynominal having independent variables of concentration and pressure.

6. Apparatus in accordance with claim 1 wherein said dissolved solid is sodium hydroxide.

7. Apparatus in accordance with claim 1 wherein said second signal and said fifth signal are measured on an upper surface of said steam chest associated respectively with said first-effect and said second-effect, whereby said second signal and said fifth signal are representative of the boiling point temperature of boiling liquid in said first-effect and second-effect.

8. A method for controlling a multiple effect evaporator having at least a first-effect and a second-effect, which increases the concentration of a dilute solution of at least one dissolved solid by heating said dilute solution in multiple evaporation zones, wherein said dilute solution is continuously introduced into said multiple-effect evaporator and a concentrated solution with respect to said dilute solution is continuously withdrawn from said mulitple effect evaporator, said method comprising the steps of:

establishing a first signal representative of the actual boiling point rise of the liquid in said first-effect;

establishing a second signal representative of the actual temperature of the liquid in said first-effect;

establishing a third signal representative of the concentration of said at least one dissolved solid in the liquid in said first-effect based on the value of said first signal and the value of said second signal;

establishing a fourth signal representative of the steam flow to said steam chest of said first-effect;

establishing a fifth signal representative of the boiling point rise of the liquid in said second-effect;

establishing a sixth signal representative of the actual temperature of the liquid in said second effect;

establishing a seventh signal representative of the concentration of said at least one dissolved solid in the liquid in said second-effect based on the value of said fifth signal, and said sixth signal;

establishing an eighth signal representative of the feed flow to said first-effect based on the value of said third signal, said fourth signal and said seventh signal; and manipulating the feed flow to said first-effect in response to said eighth signal wherein the manipulation of feed flow to said first-effect in response to said eighth signal results in the feed flow to said first effect being proportional to the concentration represented by said third signal, the steam flow represented by said fourth signal, and the concentration represented by said seventh signal to thereby maintain a solute balance for the first-effect.

9. A method in accordance with claim 8 wherein said step of manipulating the feed flow to said first-effect in response to said eighth signal comprises:

establishing a ninth signal representative of the actual pressure in a vapor space of said first-effect;

establishing a tenth signal representative of the desired concentration of said at least one dissolved solid in said first effect;

establishing an eleventh signal representative of the boiling point rise required to maintain the desired concentration represented by said tenth signal, based on the value of said ninth signal and said tenth signal;

comparing said eleventh signal and said first signal to establish a twelfth signal which is responsive to the difference between said eleventh signal and said first signal;

summing said twelfth signal and said eighth signal to establish a thirteenth signal, wherein said twelfth signal is scaled so as to bias said eighth signal in a manner that maintains said first signal substantially equal to said eleventh signal; and manipulating a control valve operably located so as to control the feed flow to said first-effect in response to said thirteenth signal.

10. A method in accordance with claim 8 wherein said step of establishing a third signal representative of the concentration of said at least one dissolved solid in the liquid in said first-effect based on the value of said first signal and the value of said second signal comprises:

calculating the value for concentration of said at least one dissolved solid from a polynominal having independent variables of boiling point rise and temperature.

11. A method in accordance with claim 9 wherein said step of establishing an eleventh signal representative of the boiling point rise required to maintain the desired concentration represented by said tenth signal, based on the value of said ninth signal and said tenth signal comprises:

calculating the boiling point rise for solutions of said at least one dissolved solid from a polynominal having independent variables of concentration and pressure.

12. Method in accordance with claim 8 wherein said step of establishing said first signal and establishing said fifth signal comprise:

establishing a ninth signal representative of the temperature of desuperheated steam flowing from said first effect to said second effect;

subtracting said ninth signal from said second signal to establish said first signal;

establishing a tenth signal representative of the temperature of desuperheated steam flowing from said second-effect to a third-effect; and subtracting said tenth signal from said sixth signal to establish said fifth signal.

13. Method in accordance with claim 8 wherein said dissolved solid is sodium hydroxide.

14. Method in accordance with claim 8 wherein said second signal and said fifth signal are measured on an upper surface of said steam chest associated respectively with said first-effect and said second-effect, whereby said second signal and said fifth signal are representative of the boiling point temperatures of boiling liquids in said first-effect and second effect.

* * * * *